United States Patent
Wang

(10) Patent No.: US 10,219,150 B2
(45) Date of Patent: *Feb. 26, 2019

(54) METHOD, CLIENT TERMINAL AND SERVER FOR ESTABLISHING COMMUNICATION

(71) Applicant: Alibaba Group Holding Limited, Grand Cayman (KY)

(72) Inventor: Yaohua Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/942,204

(22) Filed: Mar. 30, 2018

(65) Prior Publication Data

US 2018/0227751 A1     Aug. 9, 2018

Related U.S. Application Data

(63) Continuation of application No. 15/240,985, filed on Aug. 18, 2016, now Pat. No. 9,961,540.

(30) Foreign Application Priority Data

Aug. 19, 2015  (CN) .......................... 2015 1 0511390

(51) Int. Cl.
   *H04M 1/66*   (2006.01)
   *H04W 12/02*  (2009.01)
   (Continued)

(52) U.S. Cl.
   CPC ............ *H04W 12/02* (2013.01); *H04W 76/11* (2018.02); *H04W 88/02* (2013.01)

(58) Field of Classification Search
   USPC .................................. 455/410; 379/220, 207
   See application file for complete search history.

(56) References Cited

U.S. PATENT DOCUMENTS

| 5,604,792 A | 2/1997  | Solomon et al. |
| 6,157,829 A | 12/2000 | Grube et al.   |

(Continued)

FOREIGN PATENT DOCUMENTS

| CA | 2634951 | 1/2010  |
| EP | 2385690 | 11/2011 |

(Continued)

OTHER PUBLICATIONS

Office Action for U.S. Appl. No. 15/240,985, dated Nov. 13, 2017, Wang, "Method, Client Terminal and Server for Establishing Communication", 15 pages.

(Continued)

*Primary Examiner* — David Q Nguyen
(74) *Attorney, Agent, or Firm* — Lee & Hayes, P.C.

(57) ABSTRACT

A communication establishment method including acquiring a first communication number of a current communication terminal; acquiring an input image, obtaining an information code according to the image, the information code being corresponding to a second communication number; sending call information to a predetermined server, the call information being attached with the first communication number and the information code. The current communication terminal obtains the information code according to the image, provides the information code and the first communication number of the current communication terminal to the predetermined server to establish a communication between the current communication terminal that uses the first communication number and a communication terminal that uses the second communication number. Thus, a user of the current communication terminal does not need to obtain the second communication number used by the other user, which protects the number privacy of the user who uses the second communication number.

20 Claims, 11 Drawing Sheets

(51) Int. Cl.
*H04W 76/11* (2018.01)
*H04W 88/02* (2009.01)

(56) References Cited

U.S. PATENT DOCUMENTS

| | | |
|---|---|---|
| 8,910,874 B2* | 12/2014 | Lee .................. G06F 17/30879 235/462.45 |
| 2003/0123629 A1 | 7/2003 | Hussain et al. |
| 2004/0101123 A1 | 5/2004 | Garcia |
| 2012/0245985 A1* | 9/2012 | Cho ....................... G06Q 20/16 705/14.23 |
| 2014/0217167 A1 | 8/2014 | Hovdal et al. |
| 2014/0310185 A1 | 10/2014 | Staflin |
| 2015/0324624 A1* | 11/2015 | Liu .................. G06F 17/30879 235/462.11 |

FOREIGN PATENT DOCUMENTS

| | | |
|---|---|---|
| KR | 20060008140 | 4/2008 |
| KR | 20110120725 | 11/2011 |
| WO | WO9427258 | 11/1994 |

OTHER PUBLICATIONS

Office Action for U.S. Appl. No. 15/240,985, dated Jul. 19, 2017, Wang, "Method, Client Terminal and Server for Establishing Communication", 14 pages.

PCT Search Report and Written Opinion dated Oct. 21, 2016 for PCT Application No. PCT/US16/47632, 9 pages.

\* cited by examiner

METHOD, CLIENT TERMINAL AND SERVER FOR ESTABLISHING COMMUNICATION

CROSS-REFERENCE TO RELATED APPLICATION

This application is a continuation of and claims priority to U.S. patent application Ser. No. 15/240,985 entitled "METHOD, CLIENT TERMINAL AND SERVER FOR ESTABLISHING COMMUNICATION," which application is a continuation of and claims the priority to Chinese Patent Application Number 201510511390.3 filed Aug. 19, 2015, entitled "METHOD, CLIENT TERMINAL AND SERVER FOR ESTABLISHING COMMUNICATION," which applications are hereby incorporated in their entireties by reference.

TECHNICAL FIELD

The present disclosure relates to the field of communications technologies, and, more particularly, to a method, client terminal, and server for establishing communication.

BACKGROUND

A phone number is private. Although people may selectively share their personal phone numbers with others to maintain an interpersonal communication, they do not want to spread their personal phone numbers easily so as to prevent fraudulent calls, various advertisements and spam short messages.

In the conventional techniques, when one party needs to call another party, the calling party generally needs to know the phone number of the called party. For example, when making a delivery, a courier needs to get in touch with a recipient; normally, the courier may call the recipient according to the phone number recorded on the express waybill. Thus, a logistics company is able to accumulate names and phone numbers of many recipients over time. However, in some cases, once those accumulated names and phone numbers are disclosed accidentally or revealed maliciously to a third party, there may be trouble for the users of those phone numbers, such as the aforementioned fraudulent calls, advertisements and spam short messages.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

An objective of the implementation of the present disclosure is to provide a communication establishment method, client terminal, and server capable of protecting the number privacy of users.

To solve the above technical problem, the present disclosure provides a communication establishment method, which includes: acquiring a first communication number of a current communication terminal; receiving an input image, obtaining an information code according to the image, the information code corresponding to a second communication number; sending call information to a predetermined server, the call information being attached with the first communication number and the information code.

The present disclosure further provides a client terminal, which includes: a first acquiring module that acquires a first communication number of a current communication terminal; a first receiving module that receives an input image, obtain an information code according to the image, the information code corresponding to a second communication number; a first sending module that sends call information to a predetermined server, the call information being attached with the first communication number and the information code.

The present disclosure further provides a communication establishment method, including: receiving call information, the call information being attached with a first communication number and an information code, the information code being an express waybill number; acquiring a second communication number according to the information code; sending a call setup request to a basic communication server, the call setup request being attached with the first communication number and the second communication number, the call setup request being used to request the basic communication server to establish a communication between a first communication terminal that uses the first communication number and a second communication terminal that uses the second communication number.

The present disclosure further provides a server, including: a second receiving module that receives call information, the call information being attached with a first communication number and an information code such as an express waybill number; a second acquiring module that acquires a corresponding second communication number according to the information code; a second sending module that sends a call setup request to a basic communication server, the call setup request being attached with the first communication number and the second communication number, the call setup request being used to request the basic communication server to establish a communication between a first communication terminal that uses the first communication number and a second communication terminal that uses the second communication number.

The present disclosure further provides a communication establishment method, including: receiving call information, the call information being attached with a first communication number and an information code such as an express waybill number; acquiring a corresponding second communication number according to the information code; initiating a call request to a first communication terminal that uses the first communication number and a second communication terminal that uses the second communication number respectively; establishing a communication for the first communication terminal and the second communication terminal when the first communication terminal and the second communication terminal accept the call request respectively.

The present disclosure further provides a server, including: a third receiving module that receives call information, the call information being attached with a first communication number and an information code such as an express waybill number; a third acquiring module that acquires a corresponding second communication number according to the information code; a third sending module configured to initiate a call request to a first communication terminal that uses the first communication number and a second communication terminal that uses the second communication number respectively; a communication establishment module that establishes a communication for the first communication terminal and the second communication terminal when the first communication terminal and the second communication terminal accept the call request respectively.

As shown from the foregoing technical solution provided in the implementation of the present disclosure, a current communication terminal obtains an information code according to a received input image, provides the information code and a first communication number of the current communication terminal to a predetermined server to processes to establish a communication for the current communication terminal that uses the first communication number and a communication terminal that uses a second communication number. Thus, in the whole communication establishment process, a user of the current communication terminal does not need to obtain the second communication number used by the other user. Therefore, the number privacy of the user who uses the second communication number is better protected, that is, the second communication number may be represented by the information code, which avoids the disclosure of the second communication number. Moreover, such communication establishment method may initiate a call to the communication terminal that uses the second communication number without dialing the second communication number, which facilitates the initiation of the call.

BRIEF DESCRIPTION OF THE DRAWINGS

In order to explain the technical solutions of example embodiments of the present disclosure more clearly, a brief introduction of the drawings to be used for describing the embodiments will be made below. Apparently, the drawings described below merely represent some embodiments of the present disclosure, and other drawings may be obtained according to these drawings by those skilled in the art without creative labor.

DETAILED DESCRIPTION

The technical solutions in the example embodiments of the present disclosure are clearly and fully described below with reference to the accompanying drawings in the example embodiments of the present disclosure. Apparently, the example embodiments to be described merely represent a part and not all of the embodiments of the present disclosure. All other embodiments obtained by persons of ordinary skill in the art based on the example embodiments of the present disclosure without creative efforts shall belong to the protection scope of the present disclosure.

Figure 1:
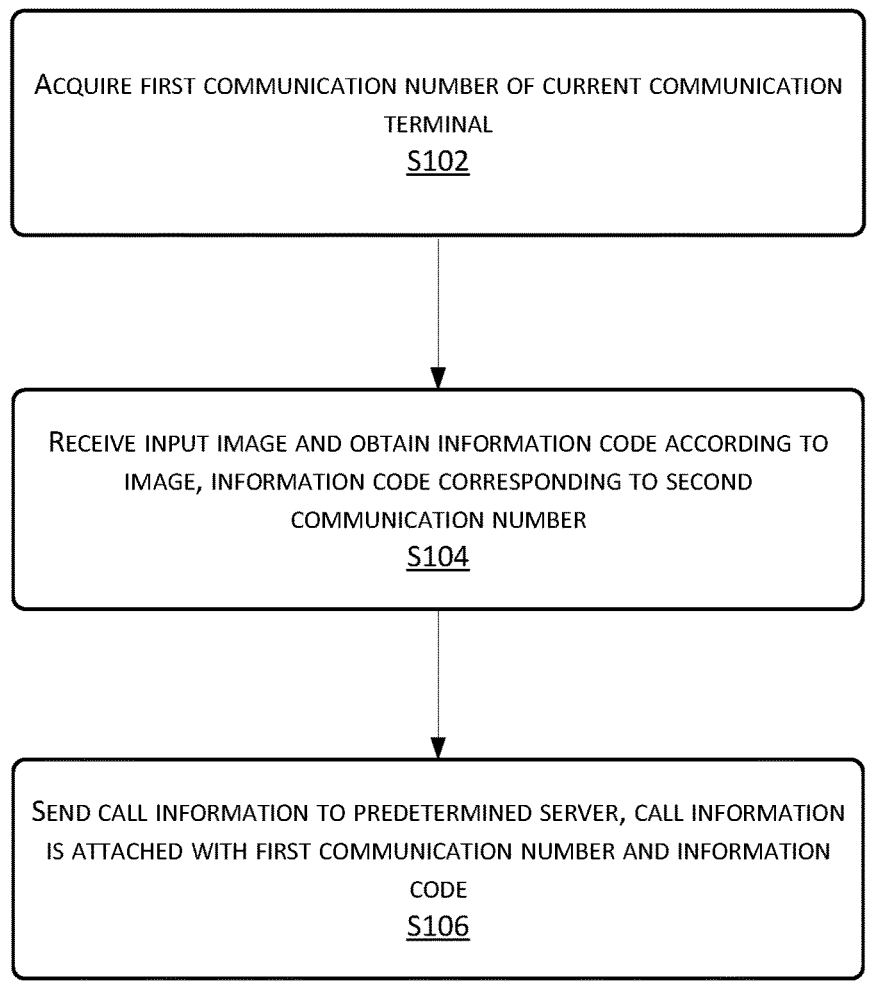
FIG. 1 is a flow chart of a communication establishment method according to an implementation of the present disclosure.

Referring to FIG. 1, an implementation of the present disclosure provides a communication establishment method including the following steps.

Step S102: a first communication number of a current communication terminal is acquired.

In the implementation, the current communication terminal may be any terminal device capable of providing a user operation interface for users and accessing a communications network. For example, the current communication terminal may be an electronic device capable of implementing mobile communication, such as, a mobile smartphone, a portable computer (such as a notebook computer), a tablet electronic device, a personal digital assistant (PDA), or a smart wearable device.

In the implementation, the current communication terminal may be attached with a first communication number. The first communication number may uniquely identify the current communication terminal, and a communication with the current communication terminal may be established by calling the first communication number. For example, the current communication terminal may be a mobile smartphone that includes a Subscriber Identity Module (SIM), which may have a communication number. As long as the current communication terminal uses the subscriber identity module having the first communication number, the first communication number corresponds to the current communication terminal. The first communication number may be a mobile phone number, and is not limited to any number segment.

In the implementation, the first communication number may be acquired by: storing the first communication number in a storage module of the current communication terminal, reading the first communication number from the storage module; recording the first communication number in a subscriber identity module, reading the first communication number from the subscriber identity module.

Step S104: an input image is received, an information code is obtained according to the image, the information code corresponding to a second communication number.

In the implementation, the image may be a graphic identifier used to store information correspondingly and express the information. For example, the image may include a barcode image, a two-dimensional code image, and a three-dimensional code image. By parsing the image with a predetermined parsing rule, stored identification information corresponding to the image is acquired.

In the implementation, the information code may be a definition code used to uniquely identify information. For example, the information code may be an express waybill number which is printed on an express waybill and contains detailed information of an express item; or an International Article Number or European Article Number (EAN) code which is printed on a commodity packaging bag and used to identify a commodity number; or a website which is presented on paper media or electronic display media and used to link a consumer to commodity information of a merchant, such as on-line discount information, lottery information, service booking, and the like. In some embodiments, the information code may further be in other forms, such as, a personalized signature or customized user name on a personal business card of a businessman, or a name, an address, a website, or the like of an enterprise in a brochure of the enterprise, to which the example embodiments of the present disclosure do not impose any restrictions.

In the implementation, the input image may be received by: scanning and capturing an image by a camera device to input the image; or receiving an image sent by other communications devices; or downloading an image from a predetermined website address. In a specific implementation, a mobile terminal configured with a camera device may be used to capture a barcode image on an express waybill to acquire an express waybill number of the express item; a mobile terminal configured with a camera device may be used to capture a barcode image on a packaging bag of a commodity to acquire an EAN code of the commodity.

In the implementation, the received image may be analyzed and identified to parse the information code. For example, the image may be any one of a barcode image, a two-dimensional code image, and a three-dimensional code image. There is a unique corresponding relationship between the image used to identify information and the information code, and by accepting the image and parsing it with a predetermined parsing rule, the corresponding information code is acquired.

In the implementation, the information code corresponds to a second communication number, indicating that there is a corresponding relationship between the information code and the second communication number, and such a corresponding relationship may be used to establish a communication between the current communication terminal that uses the first communication number and a communication terminal that uses the second communication number. For example, the information code may include: an express waybill number, an EAN code, a website, or a two-dimensional code. In a more specific implementation, an express waybill number may correspond to a contact number of an express recipient; an EAN code of a commodity that may correspond to an after-sales service number of a manufacturer of the commodity; a website of a merchant that may correspond to a customer service hotline number of the merchant; a two-dimensional code that may identify a business group, and corresponds to a contact number of the business group. The specific business group may be a government, an organization, an enterprise, an individual, or the like. In some example embodiments, the information code may further be in other forms according to an actual situation, such as a personalized signature or customized user name on a personal business card of a businessman that may correspond to a contact number of the businessman, or a name, an address, a website, or the like of an enterprise in a brochure of the enterprise that may correspond to a consulting number of the enterprise, to which the example embodiments of the present disclosure do not impose any restrictions.

In the implementation, the second communication number may uniquely identify a communication terminal, and a communication with the communication terminal may be established by calling the second communication number. For example, the communication terminal using the second communication number may be a mobile phone that includes a Subscriber Identity Module (SIM), which has a communication number. The second communication number may be a phone number of a user, which may be a landline telephone number, or a mobile phone number, and is not limited to any number segment.

In the implementation, the information code may be a preset character string, and a correspondence between the information code and a second communication number may be implemented by recording the information code and the second communication number correspondingly in a server. For example, a data table is set in the server, and the information code and the second communication number are correspondingly recorded in the data table. In this way, the correspondence between both of them is implemented. Moreover, it is also easy to search and retrieve the data.

Step S106: call information is sent to a predetermined server, the call information is attached with the first communication number and the information code.

In the implementation, the predetermined server may acquire the second communication number according to the information code, so that a communication is established between the first communication number and the second communication number. The predetermined server may be a service server, which may read, from stored data, the second communication number corresponding to the information code after obtaining the information code; provide the first communication number and the second communication number to a basic communication server, so that the basic communication server establishes a communication between the current communication terminal that uses the first communication number and the communication terminal that uses the second communication number. The predetermined server may also be a server of a telecommunication operator, which may acquire, from stored data, the second communication number corresponding to the information code according to the information code attached to the call information; and establish, according to the first communication number attached to the call information and the acquired second communication number, a communication between the current communication terminal that uses the first communication number and the communication terminal that uses the second communication number.

In the implementation, the call information may be a character string with predetermined content, which may be in a predetermined format. The call information may be used to indicate that a communication needs to be established between the current communication terminal that uses the first communication number and the communication terminal that uses the second communication number. The call information is attached with the first communication number and the information code, in which both the first communication number and the information code may be a part of the content of the call information, and may be distinguished by using a predetermined separator or by specifying a predetermined byte length; one of the first communication number and the information code is used as a part of the content of the call information, and the other is used as an attachment of the call information; or both the first communication number and the information code are used as an attachment of the call information.

In the implementation, the call information may be sent to the predetermined server through wireless communication, such as 2G/3G/4G, Wi-Fi, or Bluetooth technology.

In the implementation of the present disclosure, a current communication terminal obtains an information code according to a received input image, and provides the information code and a first communication number of the current communication terminal to a predetermined server to process to establish a communication between the current communication terminal that uses the first communication number and a communication terminal that uses a second communication number, so that in the whole communication establishment process, a user of the current communication terminal does not need to obtain the second communication number used by the other user. In this way, the number privacy of the user who uses the second communication number is better protected, that is, the second communication number is represented by the information code, which avoids the disclosure of the second communication number. Moreover, such communication establishment method initiates a call to the communication terminal that uses the second communication number without dialing the second communication number, which facilitates the initiation of the call.

In an example application scenario, a courier may initiate a call to a recipient by capturing a barcode image on an express waybill by using a mobile smartphone configured with a camera device. The mobile smartphone has a communication number of the courier, that is, the first communication number. After parsing the captured barcode image to obtain an express waybill number of the express item, that is, the information code, the mobile smartphone may send call information to a service server. The call information is attached with the first communication number of the courier and the express waybill number. The service searches the stored data according to the express waybill number to obtain a communication number of the recipient, that is, the second communication number. Further, the service server may provide the first communication number and the second communication number to a basic communication server to establish a communication between the mobile smartphone of the courier and the phone of the recipient. As shown from the above, in the process of establishing a communication with the recipient, the courier establishes the communication without knowing the phone number of the recipient, which effectively protects the number privacy of the recipient. Moreover, in such communication establishment method, the courier does not need to dial a number, which provides the courier with a quick and accurate mode for establishing a communication with the recipient, thus saving the time for the courier and improving the delivery efficiency of the courier.

In another example application scenario, a consumer may get in touch with after-sales service personnel of a manufacturer of a commodity by capturing a barcode image on the packaging bag of the commodity by using a mobile smartphone configured with a camera device. The mobile smartphone has a communication number of the consumer, that is, the first communication number. After parsing the captured barcode image to obtain an EAN code of the commodity, that is, the information code, the mobile smartphone may send call information to a service server. The call information is attached with the first communication number of the consumer and the EAN code. The service server searches the stored data according to the EAN code to obtain an after-sales service number of the manufacturer of the commodity, that is, the second communication number. Further, the service server may provide the first communication number and the second communication number to a basic communication server to establish a communication between the mobile smartphone of the consumer and a phone of the after-sales service personnel. As shown from the above, in the process of establishing a communication with the after-sales service personnel, the consumer establishes the communication without knowing the phone number of the after-sales service personnel, which effectively protects the number privacy of the after-sales service personnel. Moreover, in such communication establishment method, the consumer does not need to dial a number, which provides the consumer with a quick and accurate mode for establishing a communication with the after-sales service personnel, thus saving the time for the consumer and improving the call efficiency.

In an implementation, in the step of receiving an input image, the image may be captured by a camera device. For example, the image may be captured by a camera device configured on a mobile smartphone. In a more specific implementation, a courier may accept the image by capturing a barcode image on an express waybill by using a mobile smartphone configured with a camera device; the consumer may accept the image by capturing a barcode image on a commodity packaging bag by using a mobile smartphone configured with a camera device.

Figure 2:
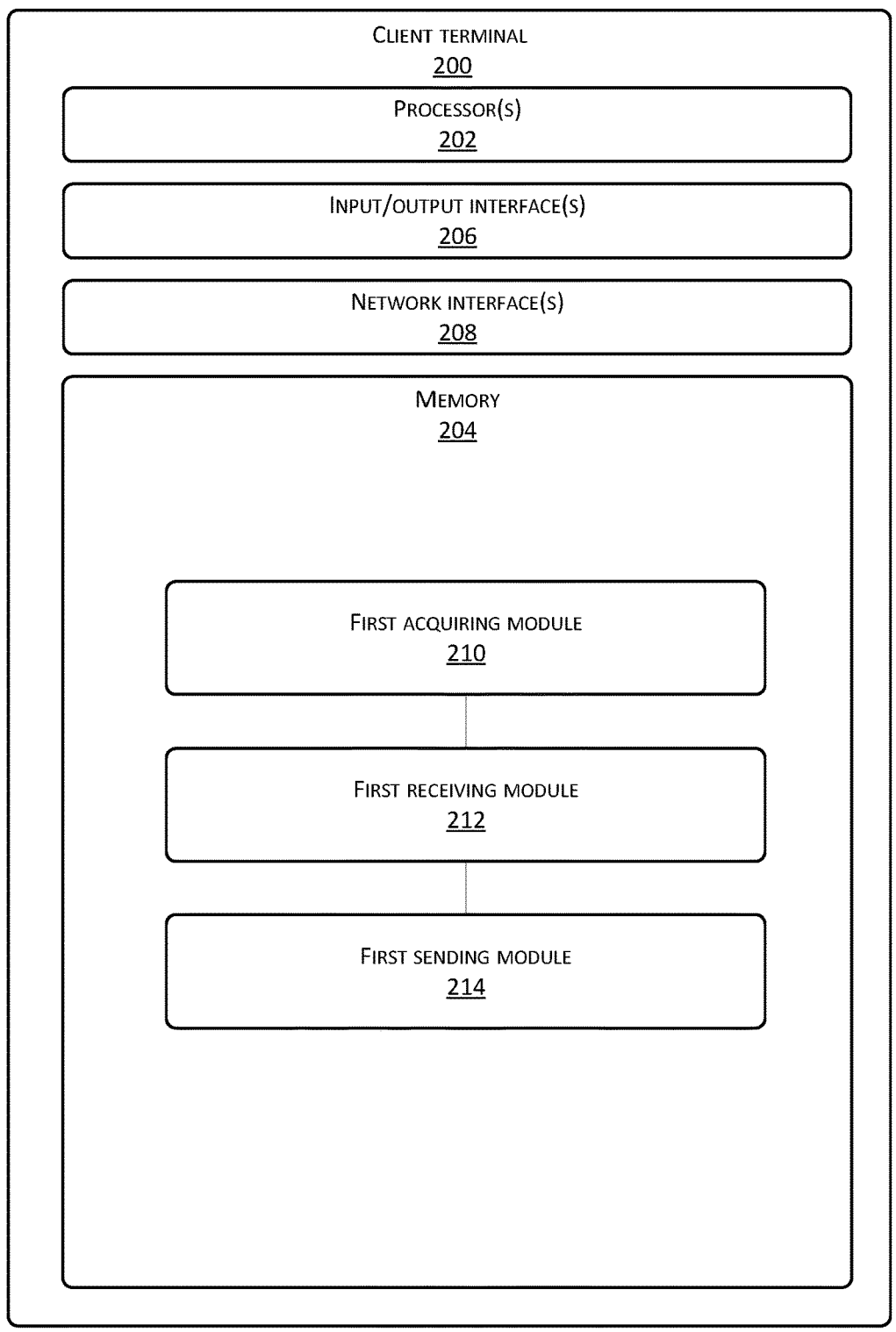
FIG. 2 is a module diagram of a client terminal according to an implementation of the present disclosure.

Please refer to FIG. 2. An implementation of the present disclosure further provides a client terminal 200, which includes one or more processor(s) 202 or data processing unit(s) and memory 204. The client terminal 200 may further include one or more input/output interface(s) 206, and network interface(s) 208. The memory 204 is an example of computer readable media.

The computer readable media include volatile and non-volatile, removable and non-removable media, and can use any method or technology to store information. The information may be a computer readable instruction, a data structure, and a module of a program or other data. Examples of storage media of a computer include, but are not limited to, a phase change memory (PRAM), a static random access memory (SRAM), a dynamic random access memory (DRAM), other types of RAMs, an ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which can be that storing information accessible to a computation device. According to the definition herein, the computer readable media does not include transitory computer readable media (transitory media), for example, a modulated data signal and a carrier.

The memory 204 may store therein a plurality of modules or units including a first acquiring module 210, a first receiving module 212, and a first sending module 214.

The first acquiring module 210 may acquire a first communication number of a current communication terminal.

In the implementation, the current communication terminal may be any terminal device capable of providing a user operation interface for users and accessing a communications network. For example, the current communication terminal may be an electronic device capable of implementing mobile communication, such as, a mobile smartphone, a portable computer (such as a notebook computer), a tablet electronic device, a personal digital assistant (PDA), or a smart wearable device.

In the implementation, the current communication terminal may be attached with a first communication number. The first communication number may uniquely identify the current communication terminal, and a communication with the current communication terminal may be established by calling the first communication number. For example, the current communication terminal may be a mobile smartphone that includes a Subscriber Identity Module (SIM), which may have a communication number. As long as the current communication terminal uses the subscriber identity module having the first communication number, the first communication number corresponds to the current communication terminal. The first communication number may be a mobile phone number, and is not limited to any number segment.

In the implementation, the first communication number may be acquired by: storing the first communication number in a storage module of the current communication terminal, reading the first communication number from the storage module; recording the first communication number in a subscriber identity module, and reading the first communication number from the subscriber identity module.

The first receiving module 212 may receive an input image, and obtain an information code according to the image. The information code corresponds to a second communication number.

In the implementation, the image may be a graphic identifier used to store information correspondingly and express the information. For example, the image may include a barcode image, a two-dimensional code image, and a three-dimensional code image. By parsing the image with a predetermined parsing rule, stored identification information corresponding to the image can be acquired.

In the implementation, the information code may be a definition code used to uniquely identify information. For example, the information code may be an express waybill number which is printed on an express waybill and contains detailed information of an express item; or an EAN code which is printed on a commodity packaging bag and used to identify a commodity number; or a website which is presented on paper media or electronic display media and used to link a consumer to commodity information of a merchant, such as on-line discount information, lottery information, service booking, and the like. In some example embodiments, the information code may be in other forms, such as, a personalized signature or customized user name on a personal business card of a businessman, or a name, an address, a website, or the like of an enterprise in a brochure of the enterprise, which is not restricted by the present disclosure.

In the implementation, the input image may be received by: scanning and capturing an image by a camera device to input the image; or receiving an image sent by other communications devices; or downloading an image from a predetermined website address. In a specific implementation, a mobile terminal configured with a camera device may be used to capture a barcode image on an express waybill to acquire an express waybill number of the express item; a mobile terminal configured with a camera device may be used to capture a barcode image on a packaging bag of a commodity to acquire an EAN code of the commodity.

In the implementation, the received image may be analyzed and identified to parse the information code. For example, the image may be any one of a barcode image, a two-dimensional code image, and a three-dimensional code image. There is a unique corresponding relationship between the image used to identify information and the information code, and by accepting the image and parsing it with a predetermined parsing rule, the corresponding information code may be acquired.

In the implementation, the information code corresponds to a second communication number, indicating that there is a corresponding relationship between the information code and the second communication number, and such a corresponding relationship may be used to establish a communication between the current communication terminal that uses the first communication number and a communication terminal that uses the second communication number. For example, the information code may include: an express waybill number, an EAN code, a website, or a two-dimensional code. In a more specific implementation, an express waybill number may correspond to a contact number of an express recipient; an EAN code of a commodity may correspond to an after-sales service number of a manufacturer of the commodity; a website of a merchant may correspond to a customer service hotline number of the merchant; a two-dimensional code may identify a business group, and corresponds to a contact number of the business group. The specific business group may be a government, an organization, an enterprise, an individual, or the like. In some embodiments, the information code may further be in other forms according to an actual situation, for example, a personalized signature or customized user name on a personal business card of a businessman may correspond to a contact number of the businessman, or a name, an address, a website, or the like of an enterprise in a brochure of the enterprise may correspond to a consulting number of the enterprise, and the embodiments of the present disclosure are not limited thereto.

In the implementation, the second communication number may uniquely identify a communication terminal, and a communication with the communication terminal may be established by calling the second communication number. For example, the communication terminal using the second communication number may be a mobile smartphone that includes a Subscriber Identity Module (SIM), which has a communication number. The second communication number may be a phone number of a user, which may be a landline telephone number, or a mobile phone number, and is not limited to any number segment.

In the implementation, the information code may be a preset character string, and a correspondence between the information code and a second communication number may be implemented by recording the information code and the second communication number correspondingly in a server. For example, a data table is set in the server, and the information code and the second communication number are correspondingly recorded in the data table. In this way, the correspondence between both of them can be implemented. Moreover, it is also easy to search and retrieve the data.

The first sending module 214 may send call information to a predetermined server, the call information being attached with the first communication number and the information code.

In the implementation, the predetermined server may acquire the second communication number according to the information code, so that a communication may be established between the first communication number and the second communication number. The predetermined server may be a service server, which may read, from stored data, the second communication number corresponding to the information code after obtaining the information code; provide the first communication number and the second communication number to a basic communication server, so that the basic communication server establishes a communication between the current communication terminal that uses the first communication number and the communication terminal that uses the second communication number. The predetermined server may also be a basic communication server, which may acquire, from stored data, the second communication number corresponding to the information code according to the information code attached to the call information; and establish, according to the first communication number attached to the call information and the acquired second communication number, a communication between the current communication terminal that uses the first communication number and the communication terminal that uses the second communication number.

In the implementation, the call information may be a character string with predetermined content, which may have a predetermined format. The call information may be used to indicate that a communication needs to be established between the current communication terminal that uses the first communication number and the communication terminal that uses the second communication number. The call information is attached with the first communication number and the information code, in which both the first communication number and the information code are a part of the content of the call information, and may be distinguished by using a predetermined separator or by specifying a predetermined byte length; one of the first communication number and the information code is used as a part of the content of the call information, and the other is used as an attachment of the call information; or both the first communication number and the information code are used as an attachment of the call information.

In the implementation, the call information may be sent to the predetermined server through a wireless communication such as 2G/3G/4G, Wi-Fi, or Bluetooth technology.

In the implementation of the present disclosure, a current communication terminal obtains an information code according to a received input image, provides the information code and a first communication number of the current communication terminal to a predetermined server. The predetermined server processes to establish a communication between the current communication terminal that uses the first communication number and a communication terminal that uses a second communication number, so that in the whole communication establishment process, a user of the current communication terminal does not need to obtain the second communication number used by the other user. In this way, the number privacy of the user who uses the second communication number is better protected, that is, the second communication number is represented by the information code, which avoids the disclosure of the second communication number. Moreover, in such communication establishment method, a call may be initiated to the communication terminal that uses the second communication number without dialing the second communication number, which facilitates the initiation of the call.

Figure 3:
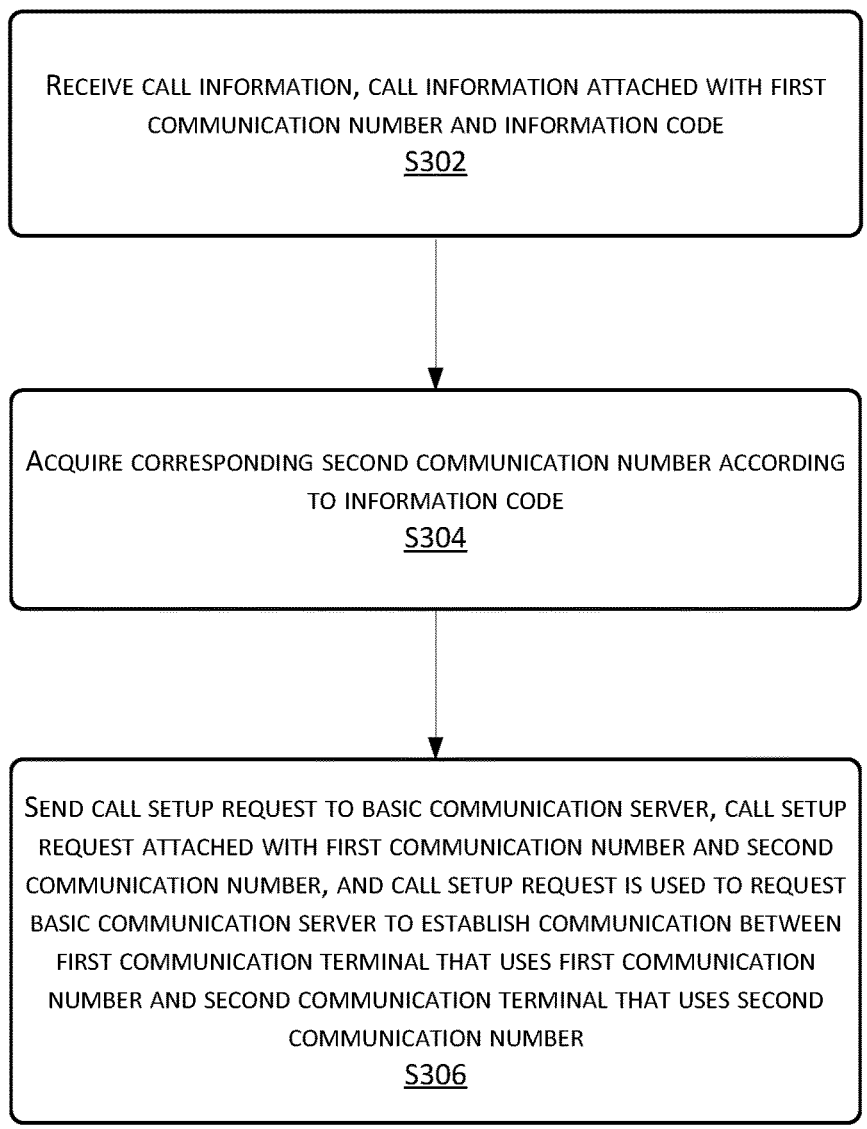
FIG. 3 is a flow chart of a communication establishment method according to an implementation of the present disclosure.

Please refer to FIG. 3. An implementation of the present disclosure further provides a communication establishment method, including the following steps.

Step S302: call information is received. The call information is attached with a first communication number and an information code. For example, the information code is an express waybill number.

In the implementation, the server may receive call information sent by a calling communication terminal. The call information indicates that a communication needs to be established between the calling communication terminal and a called communication terminal.

In the implementation, the information code may be a definition code used to uniquely identify information. For example, the information code may be an express waybill number which is printed on an express waybill and contains detailed information of an express item; or an EAN code which is printed on a commodity packaging bag and used to identify a commodity number; or a website which is presented on paper media or electronic display media and used to link a consumer to commodity information of a merchant, such as on-line discount information, lottery information, service booking, and the like. In some embodiments, the information code may be in other forms, for example, a personalized signature or customized user name on a personal business card of a businessman, or a name, an address, a website, or the like of an enterprise in a brochure of the enterprise, and the embodiment of the present disclosure is not limited thereto. In a more specific embodiment, the information code is an express waybill number.

In the implementation, the first communication number may uniquely identify a communication terminal, and a communication with the communication terminal can be established by calling the first communication number. For example, the communication terminal may be a mobile smartphone that includes a Subscriber Identity Module (SIM), which may have a communication number. As long as the communication terminal uses the subscriber identity module having the first communication number, the first communication number can be corresponding to the communication terminal. The first communication number may be a mobile phone number, and is not limited to any number segment.

In the implementation, the call information may be a character string with predetermined content, which may have a predetermined format. The call information may be used to indicate that a communication needs to be established between the communication terminal that uses the first communication number and a communication terminal that uses a second communication number. The call information is attached with the first communication number and the information code, in which both the first communication number and the information code are a part of the content of the call information, and may be distinguished by using a predetermined separator or by specifying a predetermined byte length; one of the first communication number and the information code is used as a part of the content of the call information, and the other is used as an attachment of the call information; or both the first communication number and the information code are used as an attachment of the call information.

In the implementation, the call information may be received through a wireless communication such as 2G/3G/4G, Wi-Fi, or Bluetooth technology.

Step S304: a corresponding second communication number is acquired according to the information code.

In the implementation, the information code corresponds to a second communication number, indicating that there is a corresponding relationship between the information code and the second communication number, and by using such a corresponding relationship, a communication may be established between the communication terminal that uses the first communication number and the communication terminal that uses the second communication number. For example, the second communication number and the information code may be correspondingly stored by a data table. One column in the data table is used to store second communication numbers, while another column is used to store information codes. Corresponding information code and second communication number are located in a same row. Alternatively, the information code and an index of the second communication number may be stored correspondingly. For example, a communication number set is set in a local database. A serial number is formulated for the communication number set. The serial number is an index of a corresponding second communication number. The corresponding second communication number is uniquely determined by the index. By storing the index of the second communication number and the information code correspondingly, the second communication number corresponding to the information code can be uniquely determined.

In the implementation, the second communication number may uniquely identify a communication terminal, and a communication with the communication terminal is established by calling the second communication number. For example, the communication terminal using the second communication number may be a mobile phone that includes a Subscriber Identity Module (SIM), which has a communication number. The second communication number may be a phone number of a user, which may be a landline telephone number, or a mobile phone number, and is not limited to any number segment.

Step S306: a call setup request is sent to a basic communication server, the call setup request is attached with the first communication number and the second communication number, and the call setup request is used to request the basic communication server to establish a communication between a first communication terminal that uses the first communication number and a second communication terminal that uses the second communication number.

In the implementation, the basic communication server may be a server of a telecommunications operator, which establishes a communication between communication terminals having communication numbers.

In the implementation, the call setup request may be a character string with predetermined content, which may have a predetermined format. The call setup request may be used to indicate that a communication needs to be established between the first communication terminal that uses the first communication number and the second communication terminal that uses the second communication number. The call setup request is attached with the first communication number and the second communication number, in which both the first communication number and the information code are a part of the content of the call information, and may be distinguished by using a predetermined separator or by specifying a predetermined byte length; one of the first communication number and the second communication number is used as a part of the content of the call setup request, and the other is used as an attachment of the call setup request; or both the first communication number and the second communication number are used as an attachment of the call setup request.

In the implementation, the call setup request may be sent through a wireless communication such as 2G/3G/4G, Wi-Fi, or Bluetooth technology.

In the implementation of the present disclosure, a basic communication server may process to establish a communication between a communication terminal that uses a first communication number and a communication terminal that uses a second communication number, so that in the whole communication establishment process, a user of the communication terminal that uses the first communication number does not need to obtain the second communication number used by the other user. In this way, the number privacy of the user who uses the second communication number is better protected, that is, the second communication number is represented by the information code, which avoids the disclosure of the second communication number.

In a specific application scenario, a courier may initiate a call to a recipient by capturing a barcode image on an express waybill by using a mobile smartphone configured with a camera device. The mobile smartphone has a communication number of the courier, that is, the first communication number. After parsing the captured barcode image to obtain an express waybill number of the express item, that is, the information code, the mobile smartphone may send call information to a service server. The call information is attached with the first communication number of the courier and the express waybill number. The service server queries stored data according to the express waybill number to obtain a communication number of the recipient, that is, the second communication number. Further, the service server may provide the first communication number and the second communication number to a basic communication server to establish a communication between the mobile smartphone of the courier and the phone of the recipient. As shown from the above, in the process of establishing a communication with the recipient, the courier may establish the communication without knowing the phone number of the recipient, which effectively protects the number privacy of the recipient.

Figure 4:
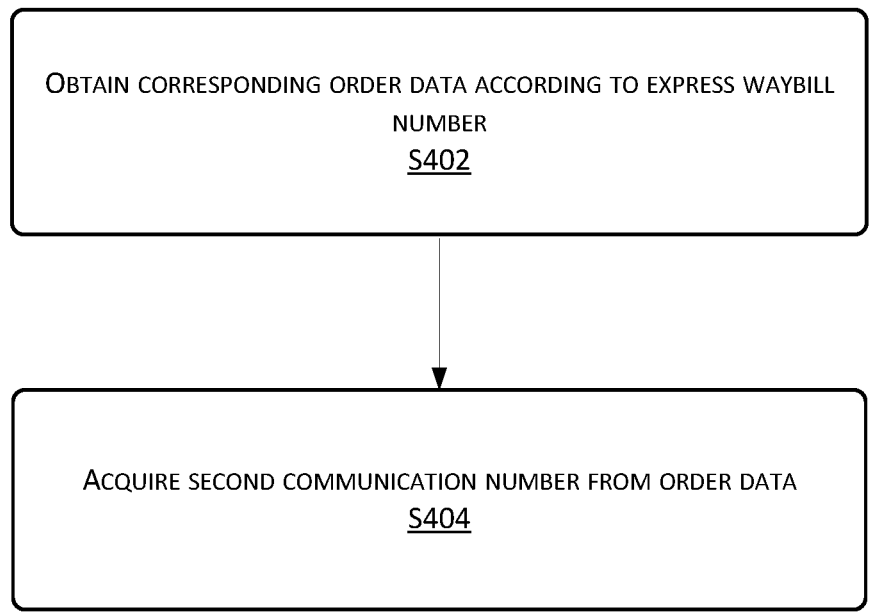
FIG. 4 is a flow chart of a communication establishment method according to an implementation of the present disclosure.

Please refer to FIG. 4, in an implementation, the second communication number of the recipient is acquired according to the express waybill number in a way as follows.

Step S402: corresponding order data is obtained according to the express waybill number.

Step S404: the second communication number is acquired from the order data.

In the implementation, the order data may include an order credential in a trade transaction, and specific content may include a commodity and/or service ordered by a user.

In the implementation, a user may send an order request to a service server by on-line shopping. The order request may include booking information of a commodity and/or service and related information of the user, wherein the related information of the user may include a name and an address of the user, and a communication number of the user. After receiving the order request, the service server may generate corresponding order data. When the commodity and/or service ordered by the user is delivered to an intermediate, which may be, for example, a logistics company, the logistics company generally formulates an express waybill number for the commodity and/or service. The express waybill number may uniquely correspond to the order data. The service server may store, in a database such as a local database, the express waybill number that uniquely corresponds to the order data, so that the user, that is, the recipient, may conveniently get circulation information and an in-transit status of the commodity and/or service in real time according to the express waybill number. The name and address of the user, and the communication number of the user that are included in the related information of the user provide related personnel such as a courier with an accurate direction prompt and convenient contact information in a delivery process after the commodity and/or service arrives at the location of the user. Therefore, by acquiring the express waybill number of the commodity and/or service, the order data corresponding thereto is obtained in the database, and, according to the obtained order data, a communication number of the user included therein, that is, the second communication number of the recipient, is further acquired.

Figure 5:
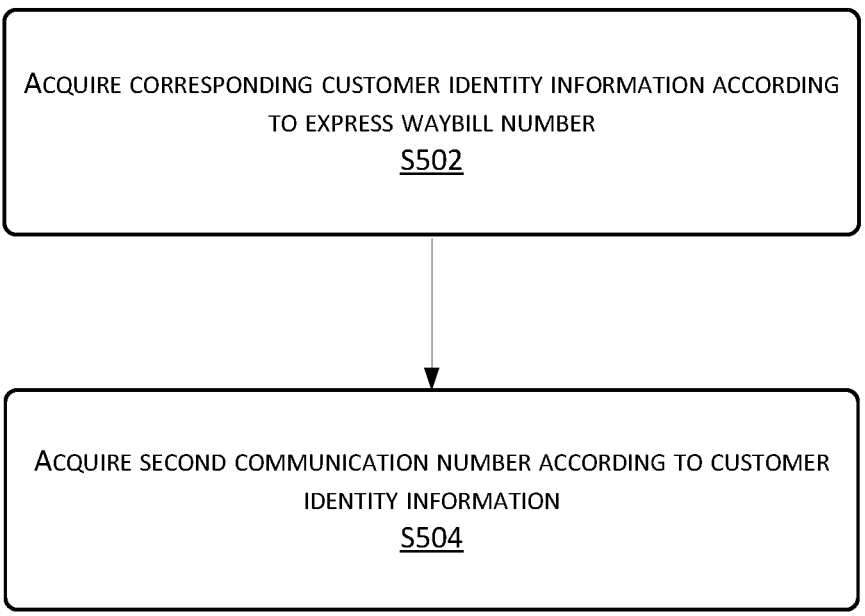
FIG. 5 is a flow chart of a communication establishment method according to an implementation of the present disclosure.

Referring to FIG. 5, in an implementation, the second communication number of the recipient is acquired according to the express waybill number in another way as follows.

Step S502: corresponding customer identity information is acquired according to the express waybill number.

Step S504: the second communication number is acquired according to the customer identity information.

In the implementation, the customer identity information may be used to uniquely identify the identity of the user, and specific content may include an identity (ID) of the user.

In the implementation, a user may send an order request to a service server by on-line shopping. The order request may include booking information of a commodity and/or service and identity information of the user. The service server may receive the order request and generate corresponding order data. When the commodity and/or service ordered by the user is delivered to an intermediate, which may be, for example, a logistics company, the logistics company generally formulates an express waybill number for the commodity and/or service. The express waybill number may uniquely correspond to the order data. A communication number of the user may be pre-stored in a database of the service server or a basic communication server, and the communication number is uniquely corresponding to the identity information of the user. In this way, the express waybill number establishes a corresponding relationship with the identity information of the user through the order data, and thus corresponds to the communication number of the user. Therefore, by acquiring the express waybill number, the customer identity information corresponding thereto is obtained, and a communication number uniquely corresponding thereto, that is, the second communication number of the recipient, is obtained in the database of the service server or basic communication server according to the obtained customer identity information.

In an implementation, the second communication number of the recipient is acquired according to the express waybill number in another way: acquiring, according to the information code, the second communication number that is stored correspondingly.

In the implementation, a corresponding association may be established for the second communication number and the information code, and the associated second communication number and information code are stored correspondingly. For example, the second communication number and the information code may be stored correspondingly by a data table. One column of the data table is used to store second communication numbers, while another column is used to store information codes. The corresponding information code and second communication number are located in a same row. Alternatively, the information code and an index of the second communication number may be stored correspondingly. For example, a communication number set is set in a local database. A serial number is formulated for the communication number set. The serial number is an index of a corresponding second communication number. The corresponding second communication number can be uniquely determined by the index. By storing the index of the second communication number and the information code correspondingly, the second communication number corresponding to the information code can be uniquely determined.

Figure 6:
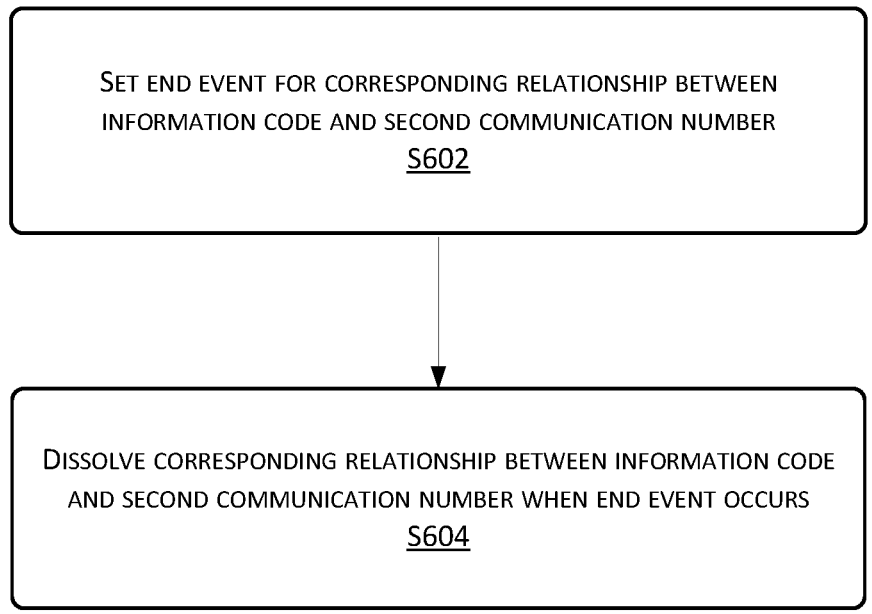
FIG. 6 is a flow chart of a communication establishment method according to an implementation of the present disclosure.

Please refer to FIG. 6. In an implementation, the method further includes the following steps.

Step S602: an end event is set for a corresponding relationship between the information code and the second communication number.

Step S604: the corresponding relationship between the information code and the second communication number is dissolved when it is detected that the end event occurs.

In the implementation, by setting an end event for the correspondence between the information code and the second communication number, when the end event occurs, the correspondence between the information code, that is, the express waybill number, and the second communication number, that is, the communication number of the recipient is dissolved. Thus, after a call is ended, the calling party of the call or a third party cannot get in touch with the second communication terminal, which uses the second communication number, again by using the information code. Therefore, even if the information code is disclosed, there will not be any issues for the user of the second communication terminal.

In a specific application scenario, a courier may initiate a call to a recipient by capturing a barcode image on an express waybill by using a mobile smartphone configured with a camera device. After the recipient signs for the express delivery, it indicates that the transaction is completed. The set end event occurs, and the correspondence between the express waybill number and the second communication number of the recipient can be dissolved. In this way, the courier or a third party can no longer get in touch with the recipient by using the express waybill number, which thus protects the recipient from potential fraud calls, advertisements, and spam short messages.

In an implementation, the express waybill number corresponds to order data. The end event may be determined according to a state of the order data, wherein the end event includes the invalidation of the order data.

In the implementation, the order data may include an order credential in a trade transaction, and specific content may include a commodity and/or service ordered by a user. The order data may have different states in different stages of a life cycle. The end event includes order invalidation, indicating that the order data is in an invalidation state. In a specific implementation, in case of on-line shopping, the order data may be generated since the user submits the order request, for the store processing, and for the logistics delivery as an intermediate. The order data may include states such as order-placed, confirmed-by-seller, paid-by-buyer, sent-by-seller, and transaction-canceled/transaction-completed. When the state of the order data is transaction-canceled or transaction-completed, it may indicate that the order data is invalidated. Once the state of the order data is transaction-canceled or transaction-completed, which may specifically include: for example the buyer cancels the order after the order is placed and before the seller sends the goods; a required commodity and/or service is temporarily unavailable or in shortage in the store of the seller and therefore the buyer cancels the order or the seller does not confirm the order; the commodity and/or service is delivered to the recipient and is confirmed and signed by the recipient, and the transaction is completed. Then, the correspondence between the information code, that is, the express waybill number, and the second communication number, that is, the communication number of the recipient, is dissolved, and the corresponding relationship between the express waybill number and the communication number of the recipient disappears. The courier or a third party can no longer get in touch with the recipient by using the express waybill number, which thus protects the recipient from potential fraud calls, advertisements, and spam short messages.

In a specific application scenario, a user may place order data to a seller by on-line shopping. Before the seller sends the goods, a corresponding relationship already exists between the express delivery order and the communication number of the user. In this case, the user cancels the order, and the transaction is terminated, and the order data is invalidated. The set end event occurs. The correspondence between the express waybill number and the second communication number of the user is dissolved. In this way, the seller or a third party can no longer get in touch with the recipient by using the express waybill number, which thus protects the recipient from potential fraud calls, advertisements, and spam short messages.

Figure 7:
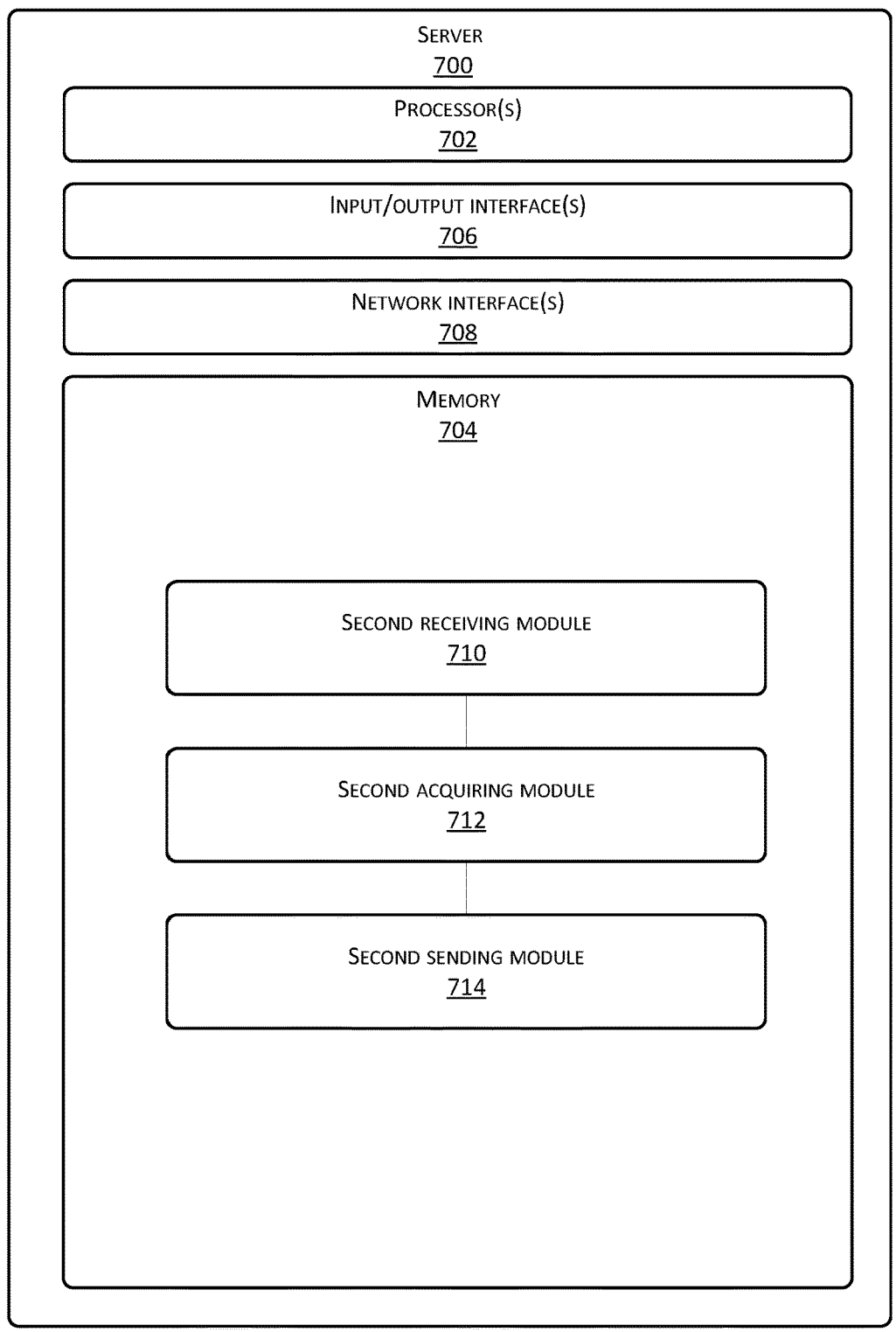
FIG. 7 is a module diagram of a server according to an implementation of the present disclosure.

Please refer to FIG. 7. An implementation of the present disclosure further provides a server 700, which includes one or more processor(s) 702 or data processing unit(s) and memory 704. The server 700 may further include one or more input/output interface(s) 706, and network interface(s) 708. The memory 704 is an example of computer readable media.

The memory 704 may store therein a plurality of modules or units including a second receiving module 710, a second acquiring module 712, and a second sending module 714.

The second receiving module 710 may receive call information, the call information being attached with a first communication number and an information code, the information code being an express waybill number.

In the implementation, the server 700 may receive call information sent by a calling communication terminal, the call information indicating that a communication needs to be established between the calling communication terminal and a called communication terminal.

In the implementation, the information code may be a definition code used to uniquely identify information. For example, the information code may be an express waybill number which is printed on an express waybill and contains detailed information of an express item; or an EAN code which is printed on a commodity packaging bag and used to identify a commodity number; or a website which is presented on paper media or electronic display media and used to link a consumer to commodity information of a merchant, such as on-line discount information, lottery information, service booking, and the like. In some embodiments, the information code may be in other forms, for example, a personalized signature or customized user name on a personal business card of a businessman, or a name, an address, a website, or the like of an enterprise in a brochure of the enterprise, and the embodiment of the present disclosure is not limited thereto. In a more specific embodiment, the information code is an express waybill number.

In the implementation, the first communication number may uniquely identify a communication terminal, and a communication with the communication terminal is established by calling the first communication number. For example, the communication terminal may be a mobile smartphone that includes a Subscriber Identity Module (SIM), which may have a communication number. As long as the communication terminal uses the subscriber identity module having the first communication number, the first communication number corresponds to the communication terminal. The first communication number may be a mobile phone number, and is not limited to any number segment.

In the implementation, the call information may be a character string with predetermined content, which may have a predetermined format. The call information may be used to indicate that a communication needs to be established between the communication terminal that uses the first communication number and a communication terminal that uses a second communication number. The call information is attached with the first communication number and the information code, in which both the first communication number and the information code are a part of the content of the call information, and may be distinguished by using a predetermined separator or by specifying a predetermined byte length; one of the first communication number and the information code is used as a part of the content of the call information, and the other is used as an attachment of the call information; or both the first communication number and the information code are used as an attachment of the call information.

In the implementation, the call information may be received through a wireless communication such as 2G/3G/4G, Wi-Fi, or Bluetooth technology.

The second acquiring module 712 may acquire a corresponding second communication number according to the information code.

In the implementation, the information code corresponds to a second communication number, indicating that there is a corresponding relationship between the information code and the second communication number, and by using such a corresponding relationship, a communication is established between the communication terminal that uses the first communication number and the communication terminal that uses the second communication number. For example, the second communication number and the information code are correspondingly stored by a data table. One column in the data table is used to store second communication numbers, while another column is used to store information codes. The corresponding information code and the second communication number are located in a same row. Alternatively, the information code and an index of the second communication number may be stored correspondingly. For example, a communication number set is set in a local database. A serial number is formulated for the communication number set. The serial number is an index of a corresponding second communication number. The corresponding second communication number is uniquely determined by the index. By storing the index of the second communication number and the information code correspondingly, the second communication number corresponding to the information code is uniquely determined.

In the implementation, the second communication number may uniquely identify a communication terminal, and a communication with the communication terminal is established by calling the second communication number. For example, the communication terminal using the second communication number may be a mobile phone that includes a Subscriber Identity Module (SIM), which has a communication number. The second communication number may be a phone number of a user, which may be a landline telephone number, or a mobile phone number, and is not limited to any number segment.

The second sending module 714 may send a call setup request to a basic communication server. The call setup request is attached with the first communication number and the second communication number. The call setup request is used to request the basic communication server to establish a communication between a first communication terminal that uses the first communication number and a second communication terminal that uses the second communication number.

In the implementation, the basic communication server may be a server of a basic communications operator, which may initiate a call to both parties according to a communication request attached with the first communication number and the second communication number.

In the implementation, the call setup request may be a character string with predetermined content, which may have a predetermined format. The call setup request may be used to indicate that a call needs to be established between the first communication terminal that uses the first communication number and the second communication terminal that uses the second communication number. The call setup request is attached with the first communication number and the second communication number, in which both the first communication number and the second communication number are a part of the content of the call setup request, and may be distinguished by using a predetermined separator or by specifying a predetermined byte length; one of the first communication number and the second communication number is used as a part of the content of the call setup request, and the other is used as an attachment of the call setup request; or both the first communication number and the second communication number are used as an attachment of the call setup request.

In the implementation, the call setup request may be sent via a wireless communication such as 2G/3G/4G, Wi-Fi, or Bluetooth technology.

In the implementation of the present disclosure, a basic communication server may process to establish a communication between a communication terminal that uses a first communication number and a communication terminal that uses a second communication number, so that in the whole communication establishment process, a user of the communication terminal that uses the first communication number does not need to obtain the second communication number used by the other user. In this way, the number privacy of the user who uses the second communication number is better protected, that is, the second communication number can be represented by the information code, which avoids the disclosure of the second communication number.

Figure 8:
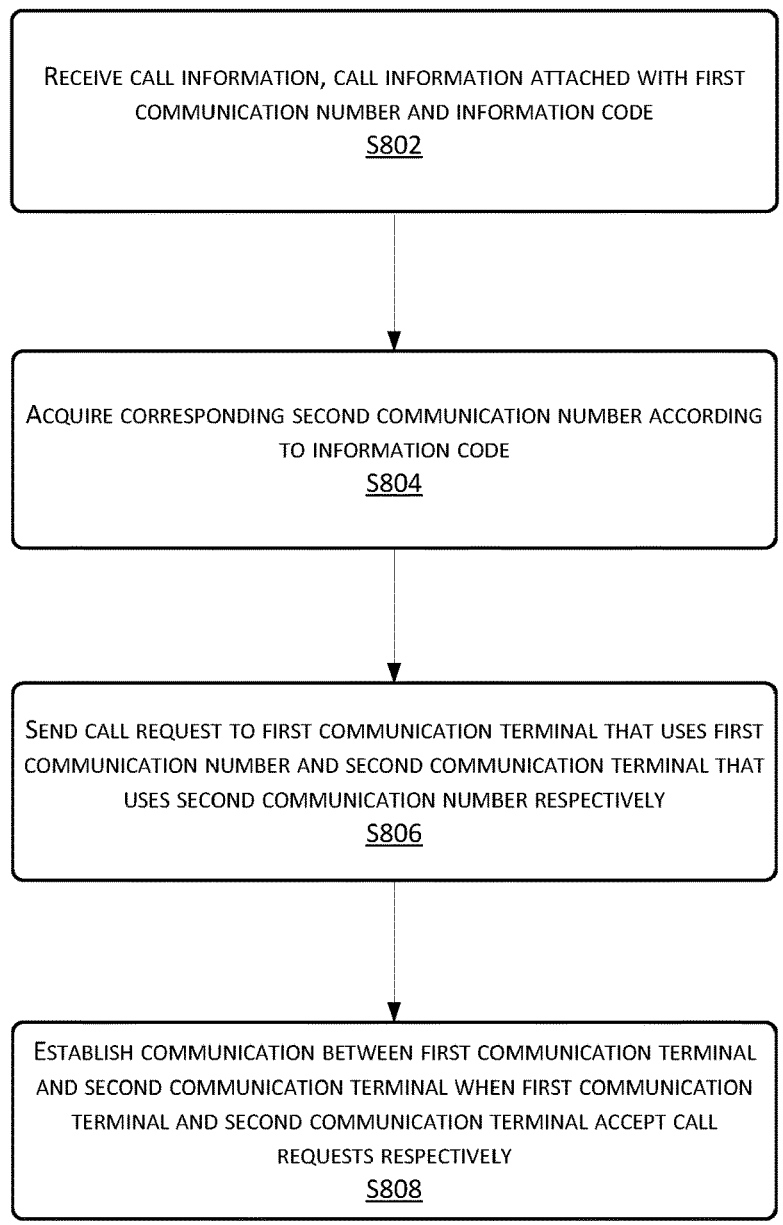
FIG. 8 is a flow chart of a communication establishment method according to an implementation of the present disclosure.

Please refer to FIG. 8. An implementation of the present disclosure further provides a communication establishment method, including the following steps.

Step S802: call information is received, the call information is attached with a first communication number and an information code, the information code is an express waybill number.

In the implementation, a basic communication server may receive call information sent by a calling communication terminal. The call information indicates that a communication needs to be established between the calling communication terminal and a called communication terminal; the basic communication server may be a server of a telecommunications operator.

In the implementation, the information code may be a definition code used to uniquely identify information. For example, the information code may be an express waybill number which is printed on an express waybill and contains detailed information of an express item; or an EAN code which is printed on a commodity packaging bag and used to identify a commodity number; or a website which is presented on paper media or electronic display media and used to link a consumer to commodity information of a merchant, such as on-line discount information, lottery information, service booking, and the like. In some embodiments, the information code may be in other forms, for example, a personalized signature or customized user name on a personal business card of a businessman, or a name, an address, a website, or the like of an enterprise in a brochure of the enterprise, and the embodiment of the present disclosure is not limited thereto. In a more specific embodiment, the information code is an express waybill number.

In the implementation, the first communication number may uniquely identify a first communication terminal, and a communication with the first communication terminal is established by calling the first communication number. For example, the first communication terminal may be a mobile smartphone that includes a Subscriber Identity Module (SIM), which may have a communication number. As long as the first communication terminal uses the subscriber identity module having the first communication number, the first communication number corresponds to the first communication terminal. The first communication number may be a mobile phone number, and is not limited to any number segment.

In the implementation, the call information may be a character string with predetermined content, which may have a predetermined format. The call information may be used to indicate that a communication needs to be established between the current communication terminal that uses the first communication number and a communication terminal that uses a second communication number. The call information is attached with the first communication number and the information code, in which both the first communication number and the information code are a part of the content of the call information, and may be distinguished by using a predetermined separator or by specifying a predetermined byte length; one of the first communication number and the information code is used as a part of the content of the call information, and the other is used as an attachment of the call information; or both the first communication number and the information code are used as an attachment of the call information.

In this implementation, the call information may be received through a wireless communication such as 2G/3G/4G, Wi-Fi, or Bluetooth technology.

Step S804: a corresponding second communication number is acquired according to the information code.

In the implementation, the information code corresponds to a second communication number, indicating that there is a corresponding relationship between the information code and the second communication number, and by using such a corresponding relationship, a communication is established between the communication terminal that uses the first communication number and the communication terminal that uses the second communication number. For example, the second communication number and the information code are correspondingly stored by a data table. One column in the data table is used to store second communication numbers, while another column is used to store information codes. The corresponding information code and the second communication number are located in a same row. Alternatively, the information code and an index of the second communication number may be stored correspondingly. For example, a communication number set is set in a local database. A serial number is formulated for the communication number set. The serial number is an index of a corresponding second communication number. The corresponding second communication number can be uniquely determined by the index. By storing the index of the second communication number and the information code correspondingly, the second communication number corresponding to the information code is uniquely determined.

In the implementation, the second communication number may uniquely identify a communication terminal, and a communication with the communication terminal is established by calling the second communication number. For example, the communication terminal using the second communication number may be a mobile phone that includes a Subscriber Identity Module (SIM), which has a communication number. The second communication number may be a phone number of a user, which may be a landline telephone number, or a mobile phone number, and is not limited to any number segment.

Step S806: a call request is sent to a first communication terminal that uses the first communication number and a second communication terminal that uses the second communication number respectively.

In the implementation, in case of acquiring the first communication number and the second communication number, the call request may be sent by the basic communication server to the first communication terminal that uses the first communication number and the second communication terminal that uses the second communication number respectively to establish a communication between the two communication terminals.

Step S808: a communication is established between the first communication terminal and the second communication terminal when the first communication terminal and the second communication terminal accept the call requests respectively.

In the implementation, as long as the first communication terminal and the second communication terminal accept the call request respectively, a communication between the two communication terminals is established.

In the implementation of the present disclosure, a basic communication server may process to establish a communication between a communication terminal that uses a first communication number and a communication terminal that uses a second communication number, so that in the whole communication establishment process, a user of the communication terminal that uses the first communication number does not need to obtain the second communication number used by the other user. In this way, the number privacy of the user who uses the second communication number is better protected, that is, the second communication number can be represented by the information code, which avoids the disclosure of the second communication number.

In a specific application scenario, a courier may initiate a call to a recipient by capturing a barcode image on an express waybill by using a mobile smartphone configured with a camera device. The mobile smartphone has a communication number of the courier, that is, the first communication number. After parsing the captured barcode image to obtain an express waybill number of the express item, that is, the information code, the mobile smartphone may send call information to a basic communication server. The call information is attached with the first communication number of the courier and the express waybill number. The basic communication server searches stored data according to the express waybill number to obtain a communication number of the recipient, that is, the second communication number, thereby establishing a communication between the mobile smartphone of the courier and the phone of the recipient. As shown from the above, in the process of establishing a communication with the recipient, the courier establishes the communication without knowing the phone number of the recipient, which effectively protects the number privacy of the recipient.

Figure 9:
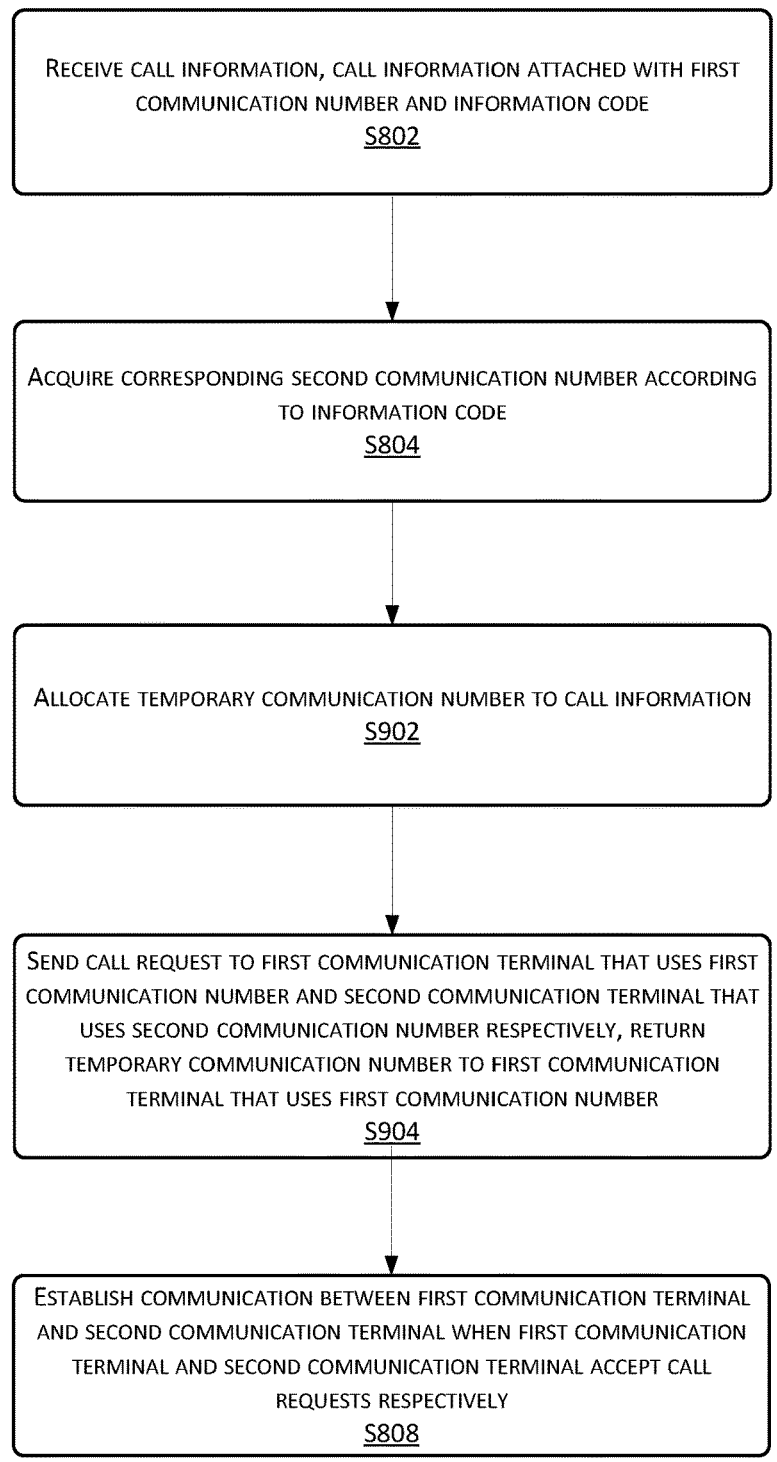
FIG. 9 is a flow chart of a communication establishment method according to an implementation of the present disclosure.

Please refer to FIG. 9, which is a variation of FIG. 8. In an implementation, the method may include the following step.

Step S802: call information is received, the call information is attached with a first communication number and an information code, the information code is an express waybill number.

Step S804: a corresponding second communication number is acquired according to the information code.

Step S902: a temporary communication number is allocated to the call information.

Step S806 may further includes returning the temporary communication number to the first communication terminal that uses the first communication number, which may be called S904 in FIG. 9. Step 904: a call request is sent to a first communication terminal that uses the first communication number and a second communication terminal that uses the second communication number respectively and the temporary communication number is returned to the first communication terminal.

Step S808: a communication is established between the first communication terminal and the second communication terminal when the first communication terminal and the second communication terminal accept the call requests respectively.

In the implementation, at Step S904, the basic communication server initiates a call to the first communication terminal and the second communication terminal. In this case, the basic communication server is a calling party, and both the first communication terminal and the second communication terminal are called parties. When initiating a call request to a communication terminal, the basic communication server may return a current calling number to the communication terminal. That is, a number may be returned to the first communication terminal or the second communication terminal as a current calling number. By returning a temporary communication number to the first communication terminal that sends the call information, the implementation is realized from the initiation of the call information to the establishment of the communication with the other party. The first communication terminal will not have access to the second communication number of the other party, which may avoid the disclosure of the second communication number and effectively protect the privacy of the user.

In the implementation, in terms of the temporary communication number allocated for the call information, at least one temporary communication number may be pre-stored for the basic communication server, and one number is selected from the at least one temporary communication number and allocated to the call information; or the basic communication server generates a temporary communication number according to a predetermined rule upon the receipt of the call information, and then allocates the generated temporary communication number to the call information.

In a specific implementation, a communication number set may be set in the basic communication server. The communication number set includes at least one temporary communication number. A temporary communication number is selected from the communication number set and allocated to the call information. In this manner, a value range of the temporary communication number is limited effectively, and usage of the temporary communication number is managed. For example, among the existing communication numbers, a number that is seldom used at present may be used as the temporary communication number; or a number in a certain segment may be used as the temporary communication number, for example, a number between "95000000000~95011111111" is used as the temporary communication number.

In the implementation, each time the communication is established, the basic communication server may allocate a different temporary communication number to the call information. That is, different temporary communication numbers may be returned to the first communication terminal in different communication processes. In this way, even if the calling party or a third party obtains a temporary communication number, the calling party or third party cannot get in touch with the other party by using the temporary communication number, thus protecting the user of the second communication terminal from potential fraud calls, advertisements and spam short messages.

In a specific application scenario, a courier may initiate a call to a recipient by capturing a barcode image on an express waybill by using a mobile smartphone configured with a camera device. The mobile smartphone carries a communication number of the courier, that is, the first communication number. The mobile smartphone parses the captured barcode image to obtain an express waybill number of the express item, that is, the information code, and sends call information to a basic communication server. The call information is attached with the first communication number of the courier and the express waybill number. Upon the receipt of the call information, the basic communication server may select one from a communication number set such as a locally configured communication number set as a temporary communication number, or generate a temporary communication number according to a predetermined rule to allocate to the call information. The basic communication server may search stored data according to the express waybill number attached to the received call information to obtain a communication number of the recipient, that is, the second communication number. Then, the basic communication server may initiate a call request to the mobile smartphone of the courier and the phone of the recipient, and return the temporary communication number to a first communication terminal that uses the first communication number, that is, the mobile smartphone of the courier, and establish a communication between the mobile smartphone of the courier and the phone of the recipient when the mobile smartphone of the courier and the phone of the recipient accept the call request. Since the real communication number of the recipient is replaced with the temporary communication number returned to the mobile smartphone of the courier, the courier will not have access to the real communication number of the recipient throughout the communication process between both parties, which avoids the disclosure of the communication number of the recipient. Moreover, different temporary communication numbers may be returned to the mobile smartphone of the courier in different communication processes, that is, a temporary communication number returned to the mobile smartphone of the courier in a certain communication process may only be used in such communication process. When the courier gets in touch with the recipient again, the temporary communication number returned to the mobile smartphone of the courier will be different from the previous temporary communication number. In this way, even if the courier or a third party obtains the temporary communication number, the courier or third party cannot get in touch with the recipient by using the temporary communication number, thus protecting the recipient from potential fraud calls, advertisements, and spam short messages.

Figure 10:
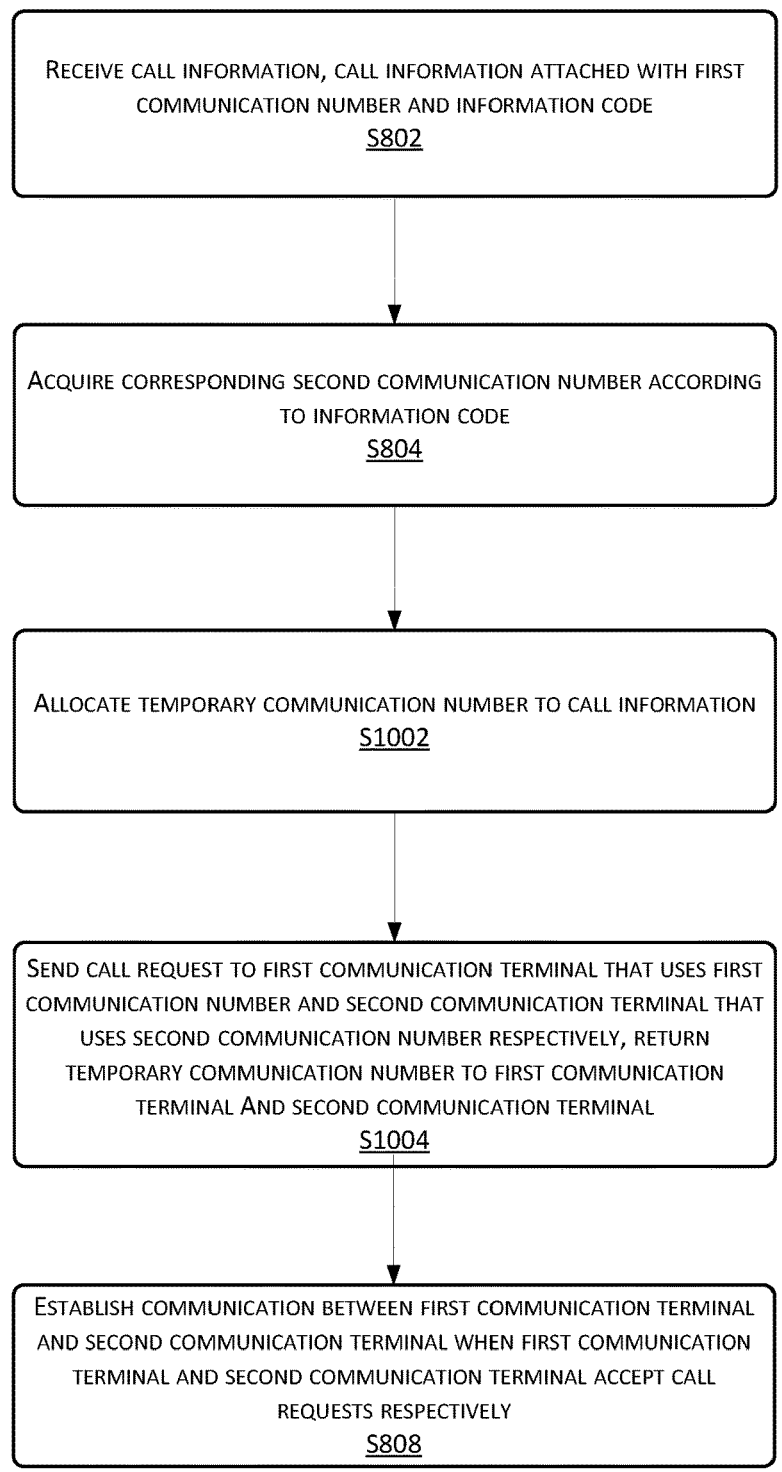
FIG. 10 is a flow chart of a communication establishment method according to an implementation of the present disclosure.

Please refer to FIG. 10, which is a variation of FIG. 8. In an implementation, the method may include the following steps.

Step S802: call information is received, the call information is attached with a first communication number and an information code, the information code is an express waybill number.

Step S804: a corresponding second communication number is acquired according to the information code.

Step S1002: a temporary communication number is allocated to the call information.

Step S1004: a call request is sent to a first communication terminal that uses the first communication number and a second communication terminal that uses the second communication number respectively and the step of sending a call request may further include returning the temporary communication number to the first communication terminal that uses the first communication number and the second communication terminal that uses the second communication number.

Step S808: a communication is established between the first communication terminal and the second communication terminal when the first communication terminal and the second communication terminal accept the call requests respectively.

In the implementation, in terms of the temporary communication number allocated to the call information, at least one temporary communication number may be pre-stored for the basic communication server, and one number is selected from the at least one temporary communication number and allocated to the call information; or the basic communication server generates a temporary communication number according to a predetermined rule upon the receipt of the call information, and then allocates the generated temporary communication number to the call information.

In a specific implementation, a communication number set may be set in the basic communication server. The communication number set includes at least one temporary communication number. A temporary communication number is selected from the communication number set and allocated to the call information. In this manner, a value range of the temporary communication number is limited effectively, and usage of the temporary communication number is managed. For example, among the existing communication numbers, a number that is seldom used at present may be used as the temporary communication number; or a number in a certain segment may be used as the temporary communication number, for example, a number between "95000000000~95011111111" is used as the temporary communication number.

In the implementation, the temporary communication number may be returned to two communication terminals that need to establish a communication, that is, the first communication terminal that uses the first communication number and the second communication terminal that uses the second communication number. In this way, the first communication number and the second communication number may be replaced with the temporary communication number in the communication process, thus preventing the second communication number and the first communication number from being disclosed. Moreover, each time the communication is established, the basic communication server may allocate a different temporary communication number to the call information, that is, a different temporary communication number may be returned to the first communication terminal and the second communication terminal in a different communication process. In this way, even if the calling party, the called party, or a third party obtains the temporary communication number, the calling party, the called party, or the third party cannot get in touch with the other party by using the temporary communication number, thus protecting users who use the second communication terminal and the first communication terminal from harassment. In a same communication process, the temporary communication numbers returned to the first communication terminal and the second communication terminal may be the same, for example, both are 95000000000; or may be different, for example, the temporary communication number returned to the first communication terminal is 95000000000, while the temporary communication number returned to the second communication terminal is 95011111111.

In a specific application scenario, a courier may initiate a call to a recipient by capturing a barcode image on an express waybill through using a mobile smartphone configured with a camera device. The mobile smartphone is associated with a communication number of the courier, that is, the first communication number. After parsing the captured barcode image to obtain an express waybill number of the express item, that is, the information code, the mobile smartphone may send call information to a basic communication server. The call information is attached with the first communication number of the courier and the express waybill number. After receiving the call information, the basic communication server may select one from a locally set communication number set as a temporary communication number, or generate a temporary communication number according to a predetermined rule to allocate to the call information. In this case, a same temporary communication number is allocated to the call information. After receiving the call information, the basic communication server may also select two communication numbers from the communication set such as a locally configured communication set as temporary communication numbers, or generate two temporary communication numbers according to the predetermined rule to allocate to the call information. In this case, different temporary communication numbers may be allocated to the call information. The basic communication server may search stored data according to the express waybill number attached to the received call information to obtain a communication number of the recipient, that is, the second communication number. Then, the basic communication server may initiate a call request to the mobile smartphone of the courier and the phone of the recipient, and return the temporary communication number to the first communication terminal that uses the first communication number, that is, the mobile smartphone of the courier, and the second communication terminal that uses the second communication number, that is, the communication terminal of the recipient, and establish a communication between the mobile smartphone of the courier and the phone of the recipient when the mobile smartphone of the courier and the phone of the recipient accept the call request. Since the real communication number of the recipient and the real communication number of the courier are replaced with the temporary communication number returned to the mobile smartphone of the courier and the temporary communication number returned to the communication terminal of the recipient respectively, the courier and the recipient cannot know the real communication number of the other party throughout the communication process between both parties, thus avoiding the disclosure of the communication numbers of both parties. Moreover, temporary communication numbers returned to the mobile smartphone of the courier and temporary communication numbers returned to the communication terminal of the recipient may be different in different communication processes, that is, a temporary communication number returned to the mobile smartphone of the courier and a temporary communication number returned to the communication terminal of the recipient in a certain communication process may only be used in such a communication process. When the courier gets in touch with the recipient again, the temporary communication number returned to the mobile smartphone of the courier and the temporary communication number returned to the communication terminal of the recipient may be different from the previous temporary communication numbers respectively. In this way, even if the courier, the recipient or a third party obtains the temporary communication number, the courier, the recipient or the third party cannot get in touch with the recipient or the courier by using the temporary communication number, thus protecting the recipient and courier from potential fraud calls, advertisements, and spam short messages.

In some cases, when the first communication terminal initiates a communication request to the second communication terminal, the second communication terminal may display a first communication number or a temporary communication number allocated to the first communication number, which could be strange number to the user of the second communication terminal. The user of the second communication terminal may reject the communication request as the user does not know the real identity and real intention of the user of the first communication terminal that initiates the call, which results in a low communication efficiency. To solve the foregoing problem, in an implementation, the step of initiating a call request may further include: sending prompt information to the second communication terminal that uses the second communication number. The prompt information may be pushed to the second communication terminal in the form of text or picture. When the second communication terminal receives the call request, the prompt information may be synchronously sent to the second communication terminal, so that the user of the second communication terminal quickly and accurately know the real identity of the user who initiates the communication, thereby reducing the communication request rejection made by the user of the second communication terminal who may not know the real identity of the other party, and improving the communication efficiency.

In a specific application scenario, a courier may initiate a call to a recipient by capturing a barcode image on an express waybill through using a mobile smartphone configured with a camera device. When a basic communication server sends a call setup request to the mobile smartphone of the courier and a communication terminal of the recipient, the communication terminal of the recipient may display a number that is strange to the recipient, and the recipient may consider it as a fraud call, an advertisement call, or a crank call and thus reject to answer. When sending the call setup request, the basic communication server may push, such as synchronously pushing, prompt information to the communication terminal of the recipient. For example, the prompt information may be "This is XX express deliver not a crank call!" or "This is XX express delivery calling! The commodity that you purchased in Tmall store XXX has arrived. Please answer this call from the courier!" or "This is the courier from XX logistics company. If it is inconvenient for you to answer the phone now, you can go to XXXX (to pick up your express item!" In this way, the recipient may quickly and accurately know the real identity and real intention of the calling user, thereby reducing the call rejection made by the recipient who may take the call as a fraud call, an advertisement call or a crank call, and therefore improving the communication efficiency.

Figure 11:
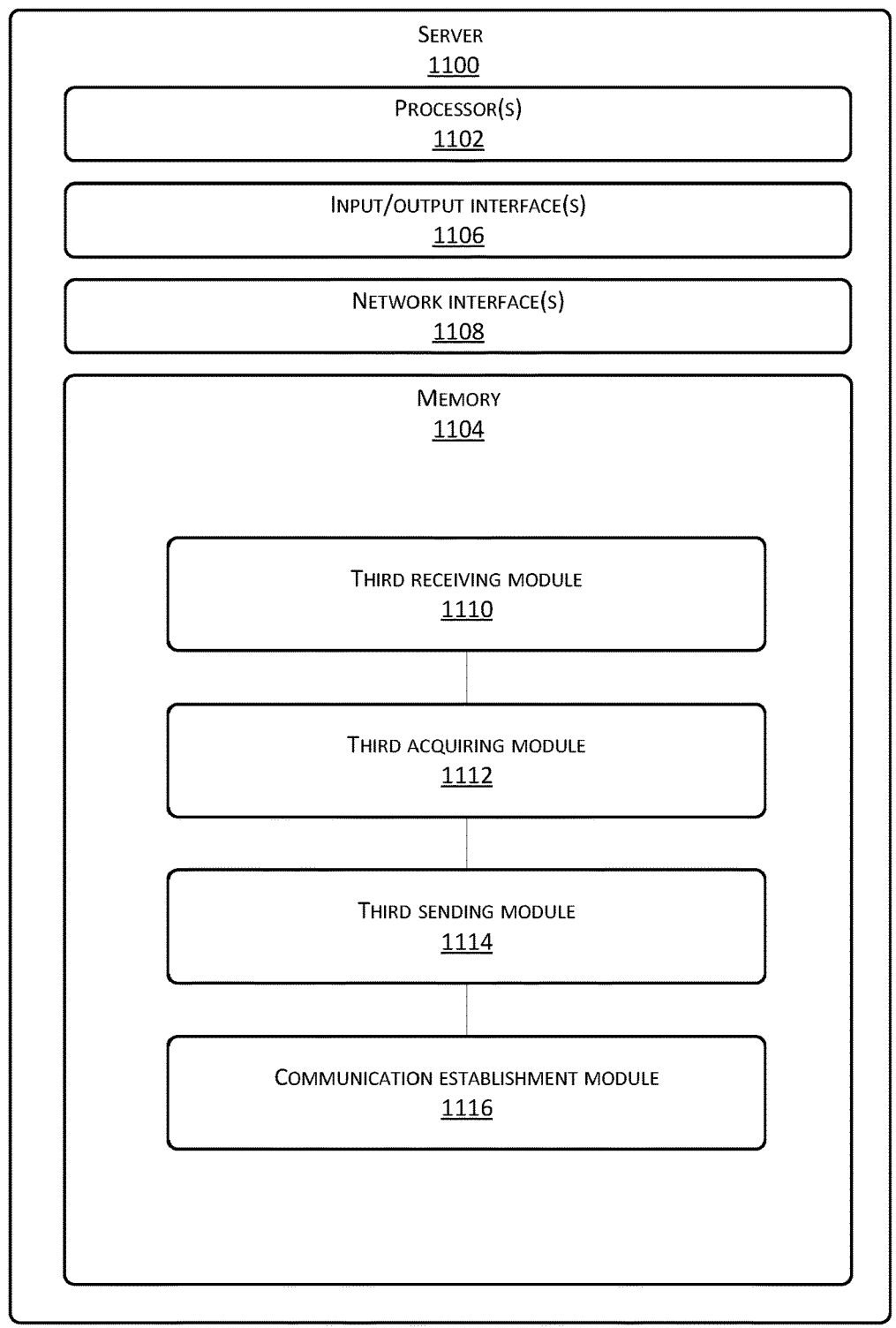
FIG. 11 is a module diagram of a server according to an implementation of the present disclosure.

Please refer to FIG. 11. An implementation of the present disclosure further provides a server 1100 which includes one or more processor(s) 1102 or data processing unit(s) and memory 1104. The server 1100 may further include one or more input/output interface(s) 1106, and network interface(s) 1108. The memory 1104 is an example of computer readable media.

The memory 1104 may store therein a plurality of modules or units including a third receiving module 1110, a third acquiring module 1112, a third sending module 1114, and a communication establishment module 1116.

The third receiving module 1110 may receive call information. The call information is attached with a first communication number and an information code. The information code is an express waybill number.

In the implementation, the server may receive call information sent by a calling communication terminal. The call information indicates that a communication needs to be established between the calling communication terminal and a called communication terminal; the basic communication server may be a server of a telecommunications operator.

In the implementation, the information code may be a definition code used to uniquely identify information. For example, the information code may be an express waybill number which is printed on an express waybill and contains detailed information of an express item; or an EAN code which is printed on a commodity packaging bag and used to identify a commodity number; or a website which is presented on paper media or electronic display media and used to redirect a consumer to commodity information of a merchant, such as on-line discount information, lottery information, service booking, and the like. In some embodiments, the information code may be in other forms, for example, a personalized signature or customized user name on a personal business card of a businessman, or a name, an address, a website, or the like of an enterprise in a brochure of the enterprise, and the embodiment of the present disclosure is not limited thereto. In a more specific embodiment, the information code is an express waybill number.

In the implementation, the first communication number may uniquely identify a first communication terminal, and a communication with the first communication terminal may be established by calling the first communication number. For example, the first communication terminal may be a mobile smartphone that includes a Subscriber Identity Module (SIM), which may have a communication number. As long as the first communication terminal uses the subscriber identity module having the first communication number, the first communication number corresponds to the first communication terminal. The first communication number may be a mobile phone number, and is not limited to any number segment.

In the implementation, the call information may be a character string with predetermined content, which may have a predetermined format. The call information may be used to indicate that a communication needs to be established for the current communication terminal that uses the first communication number and a communication terminal that uses a second communication number. The call information is attached with the first communication number and the information code, in which: both the first communication number and the information code are a part of the content of the call information, and may be distinguished by using a predetermined separator or by specifying a predetermined byte length; one of the first communication number and the information code is used as a part of the content of the call information, and the other is used as an attachment of the call information; or both the first communication number and the information code are used as an attachment of the call information.

In the implementation, the call information may be received through a wireless communication such as 2G/3G/4G, Wi-Fi, or Bluetooth technology.

The third acquiring module 1112 may acquire a corresponding second communication number according to the information code.

In the implementation, the information code corresponds to a second communication number, indicating that there is a corresponding relationship between the information code and the second communication number, and by using such a corresponding relationship, a communication is established between the communication terminal that uses the first communication number and the communication terminal that uses the second communication number. For example, the second communication number and the information code are correspondingly stored by a data table. One column in the data table is used to store second communication numbers, while another column is used to store information codes. The corresponding information code and second communication number are located in a same row. Alternatively, the information code and an index of the second communication number may be stored correspondingly. For example, a communication number set is set in a database such as a local database. A serial number is formulated for the communication number set. The serial number is an index of a corresponding second communication number. The corresponding second communication number is uniquely determined by the index. By storing the index of the second communication number and the information code correspondingly, the second communication number corresponding to the information code is uniquely determined.

In the implementation, the second communication number may uniquely identify a communication terminal, and a communication with the communication terminal is established by calling the second communication number. For example, the communication terminal using the second communication number may be a mobile phone that includes a Subscriber Identity Module (SIM), which has a communication number. The second communication number may be a phone number of a user, which may be a landline telephone number, or a mobile phone number, and is not limited to any number segment.

The third sending module 1114 may initiate a call request to a first communication terminal that uses the first communication number and a second communication terminal that uses the second communication number respectively.

In the implementation, the call request may be sent by the basic communication server, on the basis of acquiring the first communication number and the second communication number, to the first communication terminal that uses the first communication number and the second communication terminal that uses the second communication number respectively to establish a communication between the two communication terminals.

The communication establishment module 1116 may establish a communication for the first communication terminal and the second communication terminal when the first communication terminal and the second communication terminal accept the call requests respectively.

In the implementation of the present disclosure, a basic communication server may process to establish a communication between a communication terminal that uses a first communication number and a communication terminal that uses a second communication number, so that in the whole communication establishment process, a user of the communication terminal that uses the first communication number does not need to obtain the second communication number used by the other user. In this way, the number privacy of the user who uses the second communication number is better protected, that is, the second communication number is represented by the information code, which avoids the disclosure of the second communication number.

The module illustrated in the above embodiments may be implemented by one more processors or data processing units, or a product having a certain function. For the sake of convenient description, it is functionally divided into various modules which are separately described. Certainly, when implementing the present disclosure, the functions of various modules may be implemented in one or more instances of software and/or hardware, or modules implementing the same function may be implemented by a combination of a plurality of sub-modules or sub-units.

Those skilled in the art also know that, in addition to implementing a controller by pure computer readable programming codes, with a logic programming of method steps, the controller may realize a same function in the form such as a logic gate, a switch, an application specific integrated circuit, a programmable logic controller, and an embedded microcontroller. Therefore, such a controller may be regarded as a hardware component, and its apparatus for realizing various functions may be regarded as an internal structure of the hardware component. The apparatus for realizing various functions may even be regarded either as a software module for realizing a method or an internal structure of a hardware component.

The present disclosure may be described in a general context of computer-executable instructions executed by a computer, such as a program module. Generally, a program module includes routines, programs, objects, assemblies, data structure, class, etc., for executing particular tasks or implementing particular abstract data types. The application may also be implemented in a distributed computing environment. In the distributed computing environment, a task is executed by remote processing devices which are connected through a communication network. In distributed computing environment, the program module may be located in storage media (which include storage devices) of local and remote computers.

By the preceding description of the embodiments, persons skilled in the art may clearly understand that the present disclosure may be implemented via software plus the necessary general hardware platform. Based on such understanding, the substance of the technical solution of the present disclosure may be embodied in the form of a computer software product that is stored in a storage medium, such as ROM/RAM, diskette, CD-ROM, etc. and contains a plurality of computer-executable instructions enabling a computer device (which can be a personal computer, a mobile terminal, a server, a network device, and so on) to execute the methods recited in the embodiments or part of the embodiments of the present disclosure.

Example embodiments in this specification are described in a progressive manner, and for identical or similar parts between different embodiments, reference may be made to each other so that each of the example embodiments focuses on differences from the other example embodiments. The present disclosure may be used in an environment or in a configuration of universal or specialized computer systems. Examples include: a personal computer, a server computer, a handheld device or a portable device, a tablet device, a multi-processor system, a microprocessor-based system, a set-up box, a programmable electronic device, a network PC, a small-scale computer, a large-scale computer, and a distributed computing environment including any system or device above.

Only several embodiments of the present disclosure are described above, and those skilled in the art can alter or modify the embodiments of the present disclosure in many ways according to the disclosure of the application without departing from the spirit and scope of the present disclosure

What is claimed is:

1. A first communication terminal comprising:
   one or more processors; and
   one or more memories stored thereon computer-executable instructions that are executable by the one or more processors to perform acts comprising:
      acquiring an image;
      obtaining an information code according to the image, the information code being pre-associated with a second communication number of a second communication terminal; and
      sending call information including the information code and a first communication of a first communication terminal to a server, to request the server to initiate a call between the first communication terminal and the second communication terminal based at least in part on the call information, the call being initiated without the first communication terminal having the second communication number.

2. The first communication terminal of claim 1, wherein the acquiring the image includes using a camera device to capture the image.

3. The first communication terminal of claim 2, wherein the first communication terminal includes the camera device.

4. The first communication terminal of claim 1, wherein the image includes:
   a barcode image;
   a two-dimensional code image; or
   a three-dimensional code image.

5. The first communication terminal of claim 1, wherein the sending the call information to the server includes requesting the server to determine the second communication number according to the information code.

6. The first communication terminal of claim 5, wherein the sending the call information to the server further includes requesting the server to establish a communication between the first communication terminal and the second communication terminal according to the first communication number and the second communication number.

7. The first communication terminal of claim 1, wherein the call information further includes an identification representing the first communication number.

8. A communication establishment method comprising:
   acquiring an image;
   obtaining an information code according to the image, the information code being pre-associated with a second communication number of a second communication terminal; and
   sending call information including the information code and a first communication of a first communication terminal to a server, to request the server to initiate a call between the first communication terminal and the second communication terminal based at least in part on the call information, the call being initiated without the first communication terminal having the second communication number.

9. The communication establishment method of claim 8, wherein the acquiring the image includes using a camera device to capture the image.

10. The communication establishment method of claim 8, wherein the call information further includes an identification representing the first communication number.

11. The communication establishment method of claim 8, wherein the image includes:
 a barcode image;
 a two-dimensional code image; or
 a three-dimensional code image.

12. The communication establishment method of claim 8, wherein the sending the call information to the server includes requesting the server to determine the second communication number according to the information code.

13. The communication establishment method of claim 12, wherein the sending the call information to the server further includes requesting the server to establish a communication between the first communication terminal and the second communication terminal according to the first communication number and the second communication number.

14. A communication establishment method comprising:
 receiving call information at a server from a first communication terminal, the call information being attached with a first communication number corresponding to the first communication terminal and an information code, wherein a corresponding relationship between the information code and a second communication number corresponding to a second communication is stored in the server;
 acquiring the second communication number corresponding to the second communication terminal according to the information code; and
 establishing, via the server, a communication between the first communication terminal and the second communication terminal, without providing the second communication number to the first communication terminal.

15. The communication establishment method of claim 14, wherein the acquiring the second communication number includes:
 obtaining corresponding order data according to the information code; and
 acquiring the second communication number from the order data.

16. The communication establishment method of claim 14, wherein the acquiring the second communication number includes:
 acquiring corresponding customer identity information according to the information code; and
 acquiring the second communication number according to the customer identity information.

17. The communication establishment method of claim 14, further comprising:
 setting an end event for a corresponding relationship between the information code and the second communication number;
 detecting that the end event occurs; and
 dissolving the corresponding relationship between the information code and the second communication number.

18. The communication establishment method of claim 14, wherein:
 the information code includes order data;
 the end event is determined according to a state of the order data; and
 the end event includes an invalidation of the order data.

19. The communication establishment method of claim 14, further comprising:
 allocating a temporary communication number to the call information, the temporary communication number being associated with the second communication number; and
 returning the temporary communication number to the first communication terminal to display the temporary communication number instead of the second communication number at the first communication terminal.

20. The communication establishment method of claim 14, further comprising:
 allocating a first temporary communication number and a second temporary communication number to the call information, the first temporary communication number being associated with the second communication number, the second temporary communication number being associated with the first communication number, the first temporary communication number being same as or different from the second temporary communication number;
 returning the first temporary communication number to the first communication terminal to display the first temporary communication number instead of the second communication number at the first communication terminal; and
 returning the second temporary communication number to the second communication terminal to display the second temporary communication number instead of the first communication number at the second communication terminal.

* * * * *